(12) United States Patent
Whiteman

(10) Patent No.: US 6,180,006 B1
(45) Date of Patent: Jan. 30, 2001

(54) CLARIFICATION AND SOLID WASTE CONTAINMENT SYSTEM AND PROCESS

(76) Inventor: George R. Whiteman, 3050 Boles Farm La., Duluth, GA (US) 30136

(*) Notice: Under 35 U.S.C. 154(b), the term of this patent shall be extended for 0 days.

(21) Appl. No.: 09/249,034

(22) Filed: Feb. 12, 1999

Related U.S. Application Data
(60) Provisional application No. 60/074,672, filed on Feb. 13, 1998.

(51) Int. Cl.[7] ............................. B01D 21/00; C02F 9/00
(52) U.S. Cl. ..................... 210/256; 210/261; 210/474; 210/514
(58) Field of Search ....................... 210/163–165, 210/252, 261, 459, 460, 532.1, 256, 474, 477, 514; 4/291, 288, 290, DIG. 19

(56) References Cited

U.S. PATENT DOCUMENTS

| | | | |
|---|---|---|---|
| 628,146 | * | 7/1899 | Hungerbuehler . |
| 1,029,329 | * | 6/1912 | Walsh et al. . |
| 1,070,773 | * | 8/1913 | Callahan . |
| 1,245,932 | * | 11/1917 | Larson . |
| 2,101,978 | * | 12/1937 | Boosey . |
| 2,680,251 | * | 6/1954 | Cotterman . |
| 3,516,541 | * | 6/1970 | Hardingham . |
| 6,093,314 | * | 7/2000 | Wilson et al. . |

* cited by examiner

Primary Examiner—David A. Simmons
Assistant Examiner—Fred Prince
(74) Attorney, Agent, or Firm—Barnes & Thornburg; Alice O. Martin

(57) ABSTRACT

A new apparatus and method for the removal of waste material including solid wastes from a fluid is provided. The apparatus and method employ a unique combination of processes that result in extended periods of use between cleanings of the apparatus.

2 Claims, 2 Drawing Sheets

CLARIFICATION AND SOLID WASTE CONTAINMENT SYSTEM AND PROCESS

This application claims the benefit of provisional patent application serial No. 60/074,672, filed Feb. 13, 1998.

FIELD OF THE INVENTION

This invention relates to apparatus and methods for the collection and removal of waste products from liquids. More particularly, this invention relates the collection and sedimentation of solids from a fluid stream.

BACKGROUND OF THE INVENTION

The use of screens and filters to remove solid material that is suspended or otherwise part of a fluid stream has been well known. Examples of this can be seen in industry, such as conventional dual basket strainers that are placed in the stream of a chemical to be added to a manufacturing process. The strainers are placed in the stream to assure that solid material, such as dirt from a storage tank, or dried or congealed chemical itself does not reach the manufacturing process, where it could disrupt production. As one strainer fills up or becomes clogged, the flow of the stream is switched to the other. The off line strainer, the one that has clogged, is then removed and cleaned. In this way the flow of the chemical to the manufacturing process is not disrupted.

This example of an apparatus and method of removing solid material from a fluid stream illustrates a problem with prior art filtration and straining devices. These devices fill up with material, which reduces their through put, ultimately plugging and stopping flow. This requires that they be frequently cleaned, which can be an expensive and time consuming process.

SUMMARY OF THE INVENTION

This invention is an improvement over the prior art in the type of apparatus that is used, the manner in which the fluid stream is clarified and in the ability of the apparatus to remain free from plugging for an extended period.

In one embodiment of the invention there is provided a clarification unit comprising: a collection basin having sides, a top opening and a closed bottom; the collection basin having an opening in the sides near the top; a final fluid removal section comprising sides, a top and a bottom, the bottom and the top of the final fluid removal section each having an opening; the final fluid removal section being attached to the top of the collection basin; and an inlet tube that extends from the top of the final fluid removal section to a point above the bottom of the collection basin.

In another embodiment of the invention there is provided a clarification unit comprising: a collection basin having sides, a top opening and a closed bottom; the collection basin having an opening in the sides near the top; a basket strainer located inside the collection basin; and an inlet tube located inside the collection basin and extending from the top of the collection basin to a point above the bottom of the collection basin.

In yet another embodiment of the invention there is provided a clarification unit for attachment to a drain comprising: a collection basin having sides, a top opening and a closed bottom; the collection basin having an opening in the side near the top; an inlet tube located inside the collection basin; the inlet tube extending from a drain to a point above the bottom of the collection basin. In a further embodiment of this embodiment of the invention, the collection basin is made large enough so that it will remain in service without cleaning or removing waste from the unit for at least one year.

In yet another embodiment of the invention there is provided a method of removing waste material from a fluid comprising the acts of passing a fluid into a clarification unit; while in the clarification unit passing the fluid through a tube; the fluid then exiting the tube into the lower portion of a collection reservoir of the clarification unit; solid material settling out from the fluid while in the collection reservoir; the fluid filling the collection reservoir and exiting the collection reservoir from near the top of the reservoir; inverting the clarification unit whereby the settled out solid material is placed against a screen of the clarification unit which provides for fluid removal from the solid.

DRAWINGS

DETAILED DESCRIPTION OF PRESENTLY PREFERRED EMBODIMENTS OF THE INVENTION

Figure 1:
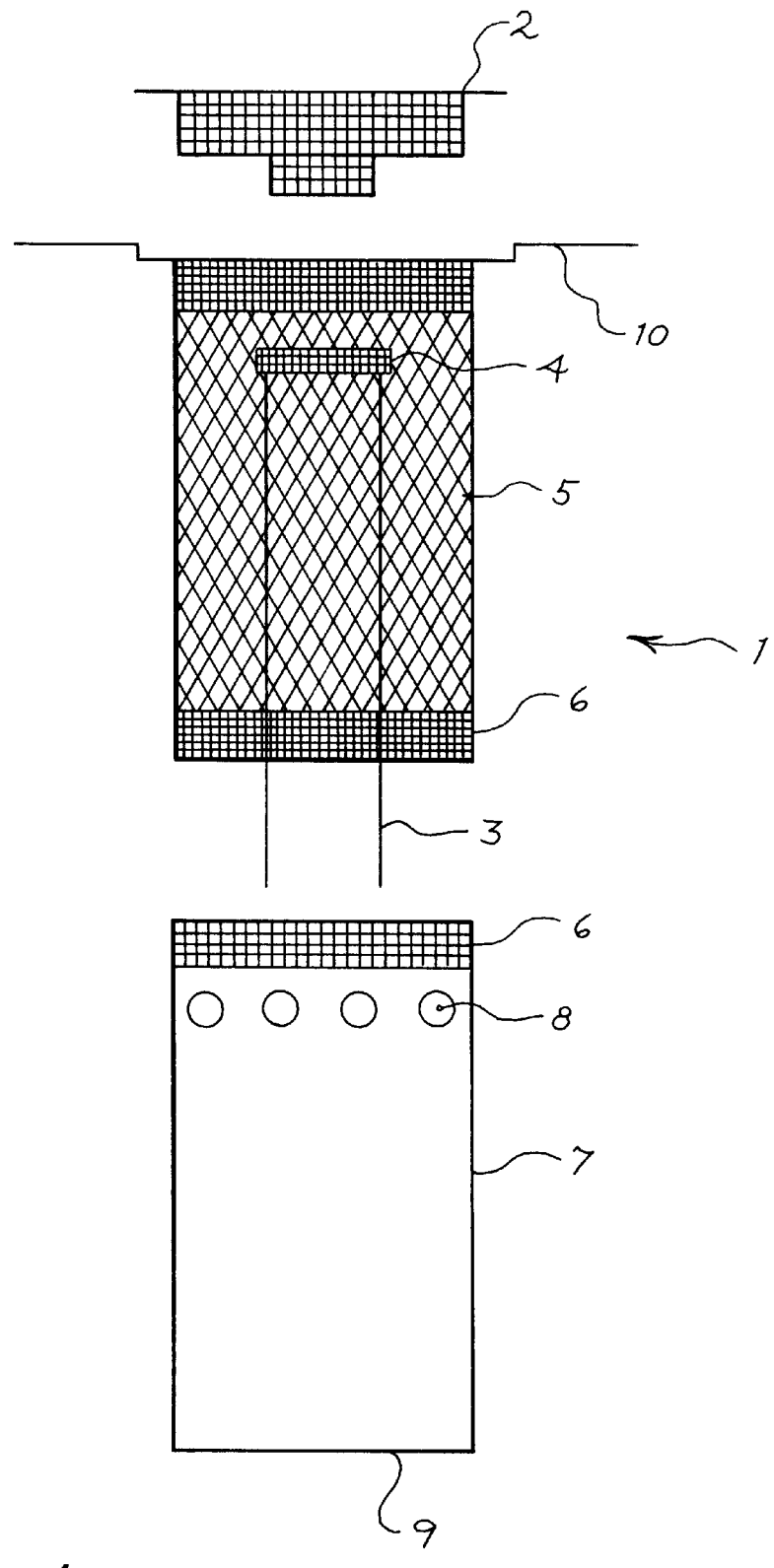
FIG. 1 is an exploded view of an embodiment of a clarification unit.
Figure 2:
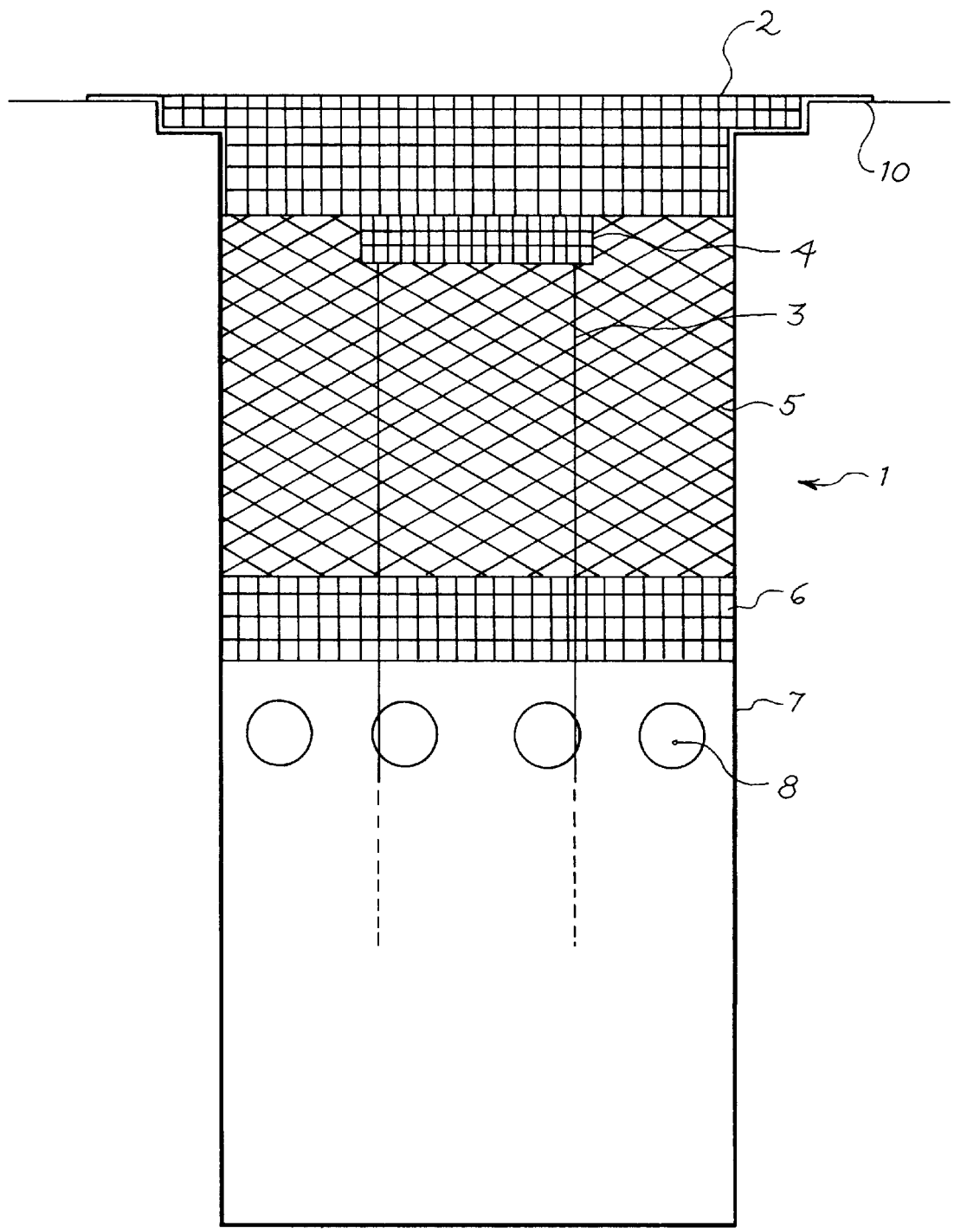
FIG. 2 shows an embodiment of a clarification unit.

Referring to FIGS. 1 and 2, there is depicted a clarification unit 1. The clarification unit has a basket screen 2 that is positioned on the top of the unit. The unit has a final fluid removal section 5 that has fitting 6 on its lower portion, with an optional fitting on the upper portion for attachment to the basket strainer. The unit has a collection basin 7 that is positioned at the bottom of the unit. The collection basin has a top opening and a closed bottom that forms a collection reservoir. The collection basin has holes 8 near its top. The collection basin has a fitting 6, which can be joined with the fitting 6 of the final fluid removal section. The unit also has an inlet tube or pipe 3 that extends from the top of the final fluid removal section to below the top of the collection basin. The top of the pipe 4 has a fitting for joining to the top of the basket screen.

There is also shown in the Figures a lip 10 that is attached to the top of the final fluid removal section. This lip serves to hold the unit in place as well as provides an additional area for the basket strainer to rest upon. The lip may be attached to the basket screen by threads, welding or any other suitable method of attachment that is compatible with the material to be filtered and the manner in which the unit will be mounted. Depending upon the manner in which the unit is mounted or positioned in a fluid stream, the lip may be modified or eliminated entirely.

In one embodiment where the lip is eliminated the basket strainer may be welded to the final fluid removal section, which is then fitted with a metal "O" ring and a gasket.

In use a fluid stream containing solid material is directed to the basket strainer 2, which removes large objects. The fluid stream then flows down the inside of the pipe 3 where it discharges from the bottom end of pipe 3 into the collection basin, where the waste material, which can be a solid, is settled out of the fluid. As more fluid flows into the collection basin, the basin will fill to the level of the holes in its side, where it exits the clarification unit. Upon leaving the unit the fluid can be recycled for use in the process for which it was employed, proceed through a second clarification unit or any number of multiple clarification units, or otherwise be disposed of or stored. As the unit is used the waste material will collect in and ultimately fill up the collection basin. At a point when sufficient waste material has been collected it can be removed from the clarification unit by turning the unit upside down and allowing the waste material to fall into the final fluid removal section. In this manner further fluid is removed from the waste material. The clarification unit is then separated at the fittings between the final fluid removal section and the collection basin so that the waste material can be removed.

The clarification unit can be used for batch or continuous operations. When used as a batch operation, the volume of the batch, the time between batches, the size of the pipe, the volume of the collection basin and the sedimentation rate of the solid material to be removed from the fluid are factors that must be evaluated when determining the size of the unit. For example, if the batch process had a volume of 1 gallon of fluid, at a rate of 0.1 gallons per minute that occurred every 8 hours, for example a clean-up operation at the end of a shift, the size of the collection basin could be much smaller than that which would be needed for a batch process that had the same volume and rate but which occurred every hour. Similar facts must be considered when evaluating the size of the unit for a continuous operation. In such an operation the basket strainer 2 could be reconfigured or eliminated, and the holes in the side of the collection basin could be reconfigured or fitted with pipes so that the unit could be inserted into a fluid stream.

The clarification unit could be attached to a pipe carrying processing fluids, the bottom of a drain, or as part of a system using a fluid. For example the unit could be inserted into a pipe that was used to transport fluid.

The clarification units could also be used in stages. In this type of use the effluent from a first collection unit would be processed through the top of a second unit and the process repeated with subsequent units until the desired amount of solids removal is obtained.

The basket screen can be made up of any material that is compatible with the fluid and solids that are being processed. For example, plastic materials such as polyvinyl chloride (PVC) and metals such as stainless steal mesh screening, or epoxy coated metals may be used. The basket screen removes large objects or larger pieces of solid material. In operations where such material are not present or not likely to be present the basket screen may not be needed. The pore or mesh size of the screen will vary depending of the size of the objects to be removed, and the throughput of the process. An example of an economical source of basket screens for the clarification unit are household sink drain basket strainers. The basket screen is attached to the top of the inlet tube and the final filtration section. It can be permanently attached or removably attached. For ease in cleaning it is preferred that the basket screen be removably attached.

The final filtration section can be made up of any material that is compatible with the fluid and solids that are being processed. For example, plastic materials such as PVC and metals such as stainless steal mesh screening, and epoxy coated metals may be used. Although it is preferred that the final filtration section be made from a mesh screen, it does not necessarily have to be a mesh material. Other pores structures, that would not be considered as a mesh, may be employed.

The collection basin has an open top and a closed bottom. The collection basin can be made out of any material that is compatible with the fluids and solids that are being processes. Commercially available pipes and tubings could be used such as stainless steel and PVC. The collection basin may be made from a material that is clear so that the level of collected solids can be easily monitored.

The inlet tube can be made of any material that is compatible with the fluids and solid materials being processed. For example, stainless steal or PVC piping may be used. The pipe should extend below the top of the collection basin and may extend down into the collection basin from about 10% to 90% of the height of the collection basin, or preferably about 25% to about 75% the height of the collection basin, or more preferably from about 25% to about 35% of the height of the collection basin.

In alternative embodiments of the clarification unit the final filtration section may be eliminated. In these embodiments the collection basin is lengthened and attached to the basket screen. In one such embodiment the collection basin would be made large enough so that the unit could operate for over 6 months and preferably over 9 months and more preferably over a year without the need for cleaning or removal of other settled solids. In another embodiment a basket strainer would be inserted inside the collection basin. The inlet tube would be attached to the basket screen. To clean the unit, once it was full, the basket screen and inlet tube would be removed and then the basket strainer, now filled with settled solids, would be pulled out, and any remaining fluid allowed to drain out. A plunger, or other device to compress the solids and further remove fluid may also be used. The settled solid could be removed from the basket strainer, or the entire basket strainer with solids disposed of, and a new strainer put in the unit.

EXAMPLE 1

A clarification unit was constructed using the following components. The basket strainer was a standard 3.5" outer diameter (OD) sink basket strainer, plus basket 1.5" inner diameter (ID). The pipe was a PVC pipe with female fitting screws onto 1.5" male drain nut. The PVC pipe was 10.5" long including threads. The final fluid removal section used a 20 mesh stainless steel screen. The mesh screen was 7" long including 1" female threads at the top, or can be spot welded, and 0.75" threads at the bottom. If spot welding is used a metal "O" ring is required with a 2" lip to support the clarification unit and on which the basket strainer sits. A gasket can be used between the "O" ring and the sink so that when the clarification unit is full a seal is created between the sink and the unit to prevent leakage. There was additionally an optional 2" lip 10 and a 0.25" drop on the top to the mesh screen to hold the basket screen when spot welding is not used. The basket screen male threads were screwed into the female threads at the top of the mesh screen. The collection basin was 10" long including 0.75" male threads at the top and a solid base. The openings in the collection basin were 0.5" diameter holes that were drilled every inch. The holes were located 1.5" from the top of the collection basin to the center of the hole. The male threads at the top of the collection basin were screwed into the female threads at the bottom of the mesh screen.

This clarification unit processes a fluid stream of a cleaning fluid. At an average through put of 3–5 gallons per minute (gpm) and removed dirt, grit and solids material.

What is claimed is:

1. A clarification unit for removing waste material from a fluid stream, said unit comprising a collection basin having sides, a top opening and a closed bottom, the collection basin having an opening in the sides near the top through which the fluid stream exits the unit when the fluid stream reaches the level of holes in the sides of the collection basin; a final fluid removal section comprising sides, a top and a bottom, wherein the bottom and the top of the final fluid removal section each have an opening, the final fluid removal section being attached to the top of the collection basin to collect the waste material from the fluid stream, said waste material being removed from the unit by inverting the unit to allow the waste material to fall into the final fluid removal section; and an inlet tube through which the fluid stream passes, extending from the top of the final fluid removal section to a point above the bottom of the collection basin.

2. The clarification unit of claim 1 further comprising a basket strainer.

* * * * *